United States Patent [19]

Tada et al.

[11] Patent Number: 4,463,296

[45] Date of Patent: Jul. 31, 1984

[54] VEHICLE MOTOR DRIVING CIRCUIT

[75] Inventors: Yoshiharu Tada; Yuichi Kitano, both of Higashimatsuyama, Japan

[73] Assignee: Diesel Kiki Kabushiki Kaisha, Tokyo, Japan

[21] Appl. No.: 353,500

[22] Filed: Mar. 1, 1982

[30] Foreign Application Priority Data

May 30, 1981 [JP] Japan .................................. 56-83187

[51] Int. Cl.³ .............................................. G05F 1/00
[52] U.S. Cl. ................................... 318/452; 318/139; 318/474; 318/678; 318/681
[58] Field of Search ............... 318/678, 681, 139, 474, 318/452

[56] References Cited

U.S. PATENT DOCUMENTS

| | | | |
|---|---|---|---|
| 3,560,829 | 2/1971 | Brennan | 318/681 X |
| 3,978,387 | 6/1976 | Nettles | 318/678 |
| 4,063,142 | 12/1977 | Sieber et al. | 318/678 |
| 4,066,945 | 1/1978 | Korte, Jr. | 318/678 |
| 4,236,106 | 11/1980 | Davis et al. | 318/678 X |
| 4,358,724 | 11/1982 | Haner | 318/678 X |

Primary Examiner—B. Dobeck
Attorney, Agent, or Firm—McAulay, Fields, Fisher, Goldstein & Nissen

[57] ABSTRACT

A driving circuit for use in controlling a motor for controlling an air mixing door, an inner and surrounding air change-over door and a mode setting door and the like used in a vehicle air conditioning device, or a motor used in opening or closing of window panes of a vehicle or in opening or closing the door which includes a control transistor for use in controlling a transistor circuit having a transistor to cause both normal and reverse directed currents to flow in a vehicle motor, the control transistor being operated until a specified period of time has elapsed after the power supply switch is turned on, the motor input being shut off by the control transistor so as to prevent erroneous operation of the motor just after the power supply switch is turned on or to prevent the production of a chattering sound caused by the operation of gear trains with the motor. The control transistor is operated with a charging voltage in a capacitor for sensing a load of the motor, the motor input is shut off when an excessive load is applied to the motor, the shut-off condition of the motor input is maintained by a self-holding transistor, an electric load in the capacitor is discharged through the control transistor when the motor is stopped, the shut-off condition of the motor input is not continued with the remaining electric load of the capacitor, whereby the stationary motor may subsequently be driven.

5 Claims, 5 Drawing Figures

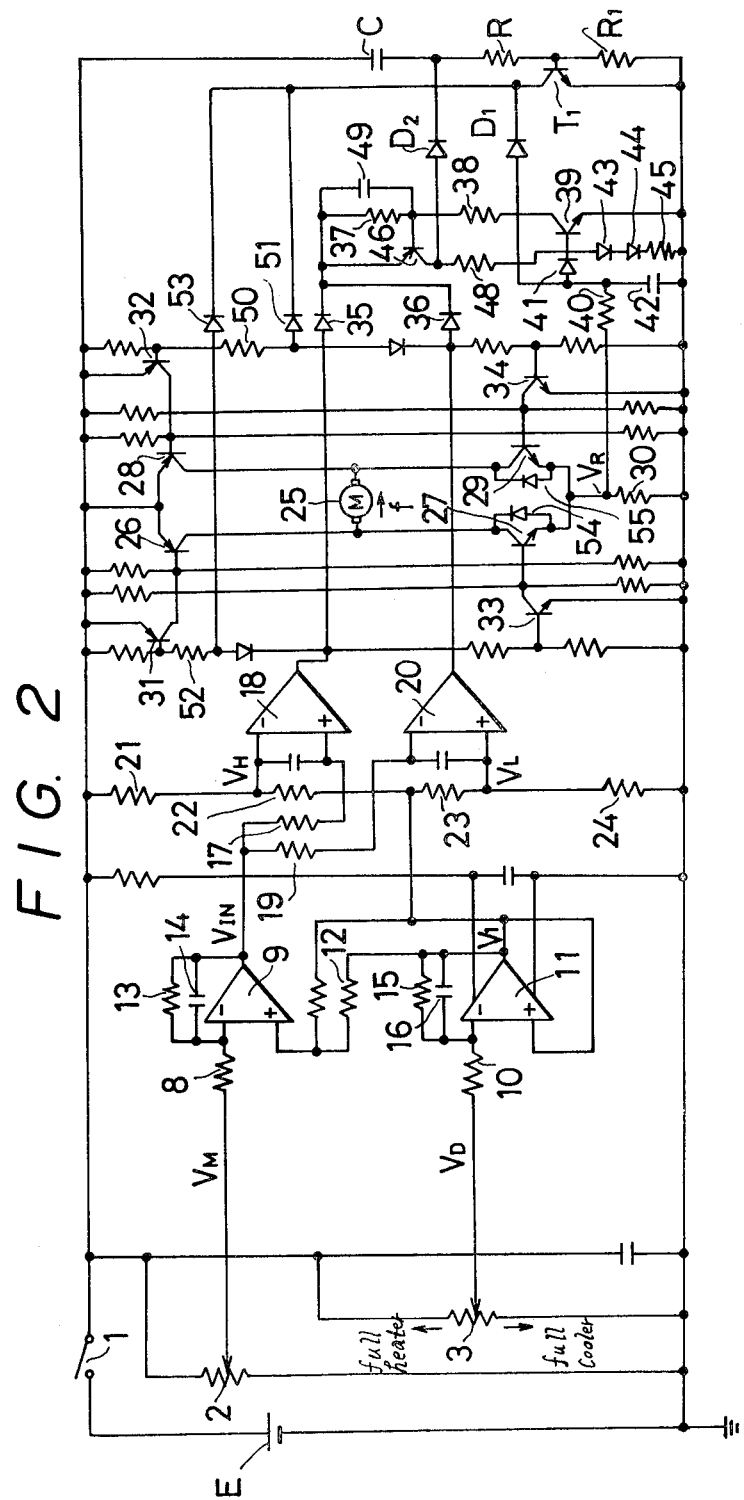

VEHICLE MOTOR DRIVING CIRCUIT

BACKGROUND OF THE INVENTION

A conventional type of a motor for use in controlling an air control door such as an air mixing door constituting one of the component elements of a vehicle air conditioning device is controlled in such a way that both an output signal $V_M$ produced at a position sensor for use in sensing an operational position of said air mixing door and another output signal $V_1$ produced by amplifying an output signal $V_D$ produced at a setting means for use in setting a position of said air mixing door are differentially amplified by a differential amplifier, and then their calculated output $V_{IN}$ is applied.

However, the conventional type of vehicle motor driving circuit disadvantageously exhibits a poor response characteristic because an integrator circuit for use in removing noise is additionally arranged at a calculating amplifier for amplifying an output signal $V_D$ produced at a position setting means for use in setting a position of said air mixing door, and further a period of time T is required until the output signal $V_1$ is increased up to a desired value because output signal $V_1$ shows a specific signal in which it may gradually be increased from a time $T_o$ when a power supply switch is turned on as shown in FIG. 1(b). On one hand, the signal $V_M$ produced at the air mixing door position sensor shows a desired value at once at a time $T_o$ when the power supply switch is turned on (FIG. 1(a)), so that said signal $V_M$ becomes higher than said signal $V_1$ immediately after the time $T_o$ when the power supply switch is turned on. As a result, the motor is erroneously operated just after the time $T_o$ when the power supply switch is turned on to cause the air mixing door to be slightly rotated in its cooling mode in which a volume of cold air is increased or a heating mode in which a volume of warm air is increased. Then, it is required to vary a setting position of the air mixing door up to such a position as indicated by the position setting means after the period of time T is passed. That is, this conventional type of door undesirably produces an unpleasant chattering sound at the gear trains cooperatively connected to the motor just after the power supply switch is turned on because the motor is rotated for a short period of time irrespective of any operational positions set in the position setting means and the position sensor. Further, the conventional type of vehicle motor driving circuit undesirably when the position setting means is abruptly changed, for example, from its full cooling mode to its full heating mode or when turned from its full heating mode to its full cooling mode, the locked condition of the motor may be kept as an operation of the motor locking inhibitor circuit constituted by a capacitor for sensing a load of the motor is not released, resulting in that a position of the air mixing door may not be controlled in response to a signal from the position setting means.

SUMMARY OF THE INVENTION

Thus, it is a primary object of the present invention to prevent unpleasant chattering sounds from being produced at the motor and the gear trains cooperatively connected thereto, by a method wherein a control transistor is provided to shut off an input to the motor just after the power supply switch is turned on, and the motor is kept stationary for a short period of time just after the power supply switch is turned on.

It is another object of the present invention to provide an accurate control over a motor in response to an operation of the position setting means by a method wherein a continuation of the shut-off condition of input to the motor kept for a longer period of time under operation of a capacitor is prevented by a forced discharge of a load of said capacitor constituting the motor lock prevention circuit which is performed by said control transistor.

BRIEF DESCRIPTION OF THE DRAWINGS

Other objects, features and advantages of the present invention will become apparent from the following detailed description in reference to the accompanying drawings wherein:

FIG. 1 is a diagram showing an operational relation between an output signal produced at a position sensor means for use in sensing a position of an air mixing door and the like to be driven by a motor and another output signal produced at a position setting means for use in setting a position of the air mixing door and the like.

FIG. 2 is a circuit diagram showing one preferred embodiment of a vehicle motor driving circuit constructed in accordance with the present invention.

DETAILED DESCRIPTION OF THE PREFERRED EMBODIMENT

At first, in FIG. 2 are shown a power supply switch 1 connected to a power supply E, and in parallel with an air mixing door position sensor 2 and a position setting the means 3 for use in setting position of the air mixing door M.

Figure 3:
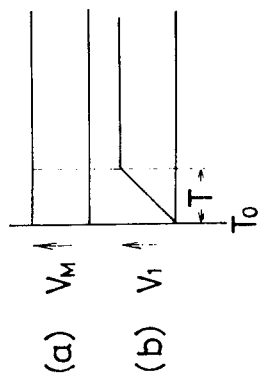
FIG. 3 is a view illustrating one example of a vehicle air conditioning device.

Said air mixing door M is, as shown in FIG. 3 is, positioned between an evaporator 4 arranged upstream in the duct 7 for use in guiding the surrounding air from outside the vehicle to the interior thereof and a heater core 5 heated by the cooling water circulated through the engine radiator. Said evaporator 4 is cooled by a compressor. A vehicle air conditioning device 6 is constituted by said air mixing door M, evaporator 4, heater core 5 and duct 7. The position of air mixing door M is controlled by a motor 25, thereby the air mixing door M controls a volume of supply of cold or cooled air fed from the outside of the evaporator 4 to the heater core 5. The cold air to be fed or supplied to the heater core 5 is heated, mixed with other cold air not supplied to the heater core 5, then blown out downstream of the duct 7. Thus, it is possible to adjust the temperature of air blown into the vehicle by controlling the position of the air mixing door M and by adjusting a heating rate of the cold air fed from outside the evaporator. In this case, the air mixing door M is opened to the maximum until it abuts against the inner wall of the duct 7, as shown in FIG. 3a, all the cold or cooled air fed from the evaporator 4 is supplied or fed to the heater core 5, resulting in that the temperature of the blown air is increased. The state described above is called as the full heating mode.

To the contrary, when the air mixing door M is opened in an opposite direction as shown in FIG. 3b and the cold air fed from the evaporator 4 is not supplied to the heater core 5, the temperature of the blown air is lowered. The latter as described above is called as the full cooling mode. In both cases of the full heating mode and the full cooling mode, the air mixing door M is forcibly contacted with the inner wall of the duct to prevent air leakage at the contacted portion.

As described above, air mixing door M adjusts the mixing ratio between the warm air and the cold air in the vehicle air conditioning device 6 having the evaporator 4 and the heater core 5, the air conditioning device 6 being set to a full heating mode or a full cooling mode under the operational contact of the air mixing door with the inner wall of the duct 7.

The air mixing door portion sensor 2 is constituted by a variable resistor which is operatively connected to the air mixing door M, the output signal $V_M$ produced at the position sensor 2 is fed to the inverted input terminal of the calculation amplifier 9 through a resistor 8. The position setting means 3 is constituted by a variable resistor whose valve may manually be adjusted. The output signal $V_D$ produced at the position setting means 3 is fed to the inverted input terminal of the calculation amplifier 11 through the resistor 10, and the output signal $V_1$ produced at the calculation amplifier 11 is fed to the non-inverted input terminal of the calculation amplifier 9 through the resistor 12. The calculation amplifier 9 is operated as a differential amplifier in which a parallel connected circuit having both a resistor 13 and a noise eliminating capacitor 14 is provided and a value of the output $V_{IN}$ represents a value of displacement between a setting position of the air mixing door M set by the position setting means 3 and an actual position of the air mixing door M sensed by the position sensor means 2. The calculation amplifier 11 is operated as an amplifier for use in amplifying output signal $V_D$ and has a parallel-connected circuit constituted by the resistor 15 and the noise supressing capacitor 16. The output signal $V_{IN}$ produced at calculation amplifier 9 is fed to the non-inverted input terminal of the calculation amplifier 18 through the resistor 17 and at the same time fed to the non-inverted input terminal of the calculation amplifier 20.

The calculation amplifiers 18, 20 constitute a window-type comparator, a reference voltage $V_H$ produced at a connecting point between the resistor 21 and the resistor 22, and a reference voltage $V_L$ produced at a connecting point between the resistor 23 and the resistor 24 is fed to the non-reversed input terminal of the calculation amplifier 20. The operational relation between the values $V_H$ and $V_L$ is set to show $V_H > V_L$.

Reference numeral 25 indicates a motor for use in controlling a degree of opening of the air mixing door, one end of its power supply terminal is connected to a collector of PNP transistor 26, connected to a collector of NPN transistor 27, and the other terminal is connected to a collector of PNP transistor 28 as well as to a collector of NPN transistor 29. The emitters of the transistors 26, 28 are connected to the power supply, and the emitters of the transistors 27, 29 are connected to the earth through resistor 30. To the transistors 27, 29 are connected anodes and cathodes of the diodes 54, 55 at its emitter and collector, respectively. Between the base and emitter of said transistor 26 is connected PNP type transistor 31, and between the base and emitter of the transistor 28 is connected PNP type transistor 32, between the base of the transistor 27 and the ground is connected NPN type transistor 33, and further between the base of the transistor 29 and the earth is connected NPN type transistor 34. The output signal from said calculation amplifier 18 is fed to the base of the transistor 31 and the base of the transistor 33, and the output signal from the calculation amplifier 20 is fed to the base of the transistor 32 and the base of the transistor 34. Further, the outputs from calculation amplifiers 18, 20 are fed to the collector of the transistor 39 through diodes 35, 36 and through resistors 37, 38. The transistor 39 acts to sense an excessive load of the motor and terminate an operation of the motor. To the base of the transistor 39 is fed a voltage $V_R$ produced at said resistor 30 through the resistor 40 and the diode 41. Between the resistor 40 and the diode 41 is connected the other terminal end of the load sensing capacitor 42 of which one terminal end is connected to the earth. The cathode terminal of diode 41 is connected to ground through diodes 43, 44 and resistor 45. One end of resistor 37 is connected to an emitter of the transistor 46, the other end of resistor 37 is connected to a base of the transistor 46, and a collector of the transistor 46 is connected to a cathode of diode 41 through resistor 48. To resistor 37 is connected in parallel a capacitor 49. The transistor 46 operates as a self-holding circuit for keeping an ON condition of the transistor 39. $T_1$ is a NPN type transistor constituting a motor termination circuit, and to its collector is connected one end of the capacitor 42 through diode $D_1$ and further a base of the transistor 32 is connected through resistor 50 and the diode 51, and a base of the transistor 31 is connected through resistor 52 and diode 53. Its emitter is connected to the ground and further to its base is connected a power supply switch 1 through a capacitor C for use in setting an initial condition and a resistor R. To the base and emitter of the transistor $T_1$ is connected a resistor $R_1$, and to a connecting point between the resistor R and the capacitor C is connected a collector of the transistor 46 through diode $D_2$.

In operation, the vehicle motor driving circuit constructed as above is operated in such a way that the output signal $V_{IN}$ from the calculation amplifier 9 shows a relation of $V_{IN} > V_N$, the output from the calculation amplifier 18 is set at a high level (hereinafter called as H level) and the output from the calculation amplifier 20 is set at a low level (hereinafter called as L level), resulting in that the transistor 31 is set of OFF, the transistor 26 ON, the transistor 34 OFF, and the transistor 29 ON.

Therefore, to the motor 25 is supplied an electric current in the direction of arrow f through the transistor 26, motor 25, transistor 29 and resistor 30, then the motor 25 is rotated in a normal direction. At this time, the transistor 32 is kept ON, the transistor 28 OFF, the transistor 33 ON and the transistor 27 OFF, in this way, the motor 25 is rotated when an electric current is flowed to it in a direction of arrow f and as the position of the air mixing door is varied up to its setting position, the output $V_{IN}$ from the calculation amplifier 9 is gradually decreased. When a relation of $V_H > V_{IN} > V_L$ is found, the outputs from the calculation amplifier 18, 20 are set to L level, so that the transistor 39 is ON, the transistor 26 OFF, the transistor 34 OFF, the transistor 29 ON. Thus, electric current supplied to the motor 25 is shut off and an electric current caused by a reverse electromotive voltage of the motor 25 flows through the motor 25, transistor 27 and diode 55, and thus the motor 25 is abruptly stopped. To the contrary, in case the motor 25 is rotated in an opposite direction because of the flow of electric current opposite to that of the arrow f before its stop, an electric current caused by a reverse electromotive voltage in the motor 25 flows through the motor 25, transistor 29, and diode 54, and finally the motor 25 is abruptly stopped. When the output $V_{IN}$ from the calculation amplifier 9 is decreased to show a relation of $V_L > V_{IN}$, the transistors 28, 27 are set ON, and an electric current opposite to that of the arrow f is flowed in the motor 25, so that the motor is rotated in an opposite direction to vary a position of the air mixing door. Thereby, the output $V_{IN}$ is increased to show a relation of $V_H > V_{IN} > V_L$ and then the motor 25 is stopped. Therefore, the rotational position of the motor 25 is always changed to such a position as indicated by the position setting means 3. That is, when a value of $V_D$ is varied, a position of the air mixing door M is varied as well as a value of $V_M$ is also varied to keep a relation of $V_H > V_{IN} > V_L$.

Figure 1:
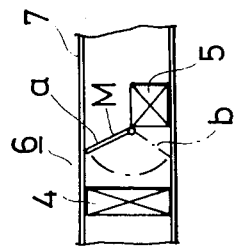

The operation of the motor just after the power supply switch 1 is turned is as follows. The output signal $V_M$ from the air mixing door position sensor 2, as shown in FIG. 1(a), at the time $T_o$ when the power supply switch 1 is turned on is increased substantially in synchronism with the time $T_o$ when the switch is turned on. However, the output signal $V_1$ from the calculation amplifier 11 for use in amplifying the signal $V_D$ is gradually increased as shown in FIG. 1(b) due to an existence of an integrating circuit constituted by the resistor 10 and the capacitor 16, resulting in having a delay time T until it reaches a normal value. Thus, at this period T, the output signal $V_{IN}$ from the calculation amplifier 9 for use in sensing a difference between $V_M$ and $V_D$ is increased up to a desired value without having any relation with the position of the position setting means 3 and the position sensing means 2. During this period T, the motor 25 operates erroneously and as a result some chattering sounds are produced at the motor 25 and the gear trains cooperatively arranged with the motor.

Thus, according to the present invention, when the power supply switch 1 is turned on, a base voltage is fed to the transistor $T_1$ through capacitor C and resistor R, then the transistor $T_1$ is kept ON for a period when the capacitor C is completely charged (the charge completion time is substantially set to a period T), the base voltage of the transistors 32, 31 are decreased to that of the ground through diodes 51, 53, resulting in that the transistors 31, 32 are turned ON, the transistors 26, 28 OFF, no electric current flows to the motor 25. Therefore, it is possible to overcome the problem of producing errorneous operation for a period of time T just after the power supply switch 1 is turned on. Upon completion of the charging of the capacitor C, that is, upon lapse of the period of time T, the transistor $T_1$ is returned to its OFF condition, the OFF-condition of the motor is released, then a normal control operation is performed.

Figure 4:
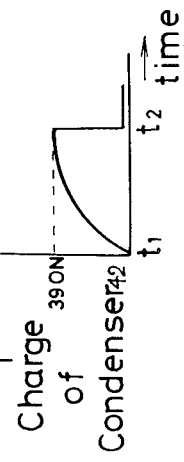
FIG. 4 is a view indicating an operational relation between a setting range of the position setting means and a rotational range of the air mixing door.
Figure 5:
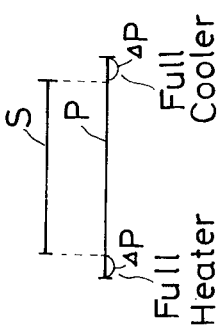
FIG. 5 is a view showing a variation of capacity in a capacitor for use in sensing a load of the motor.

Further, in case that an operating means for the position setter 3 is operated to cause its setting portion to be set at its maximum or minimum position and the air mixing door M is set to either a full heating mode or a full cooling mode, the setting range P of the position setting means 3 is, as shown in FIG. 4, set under by ΔP than a rotational range S of the air mixing door. The object of this setting is to eliminate poor operation of the air mixing door caused by a disturbance in the resistances of the variable resistor used in the position setting means 3 and/or a position sensor means 2, or a disturbance of the resistances caused by an arrangement of the position sensing means 2. Thus, when the setting range of the position setting means 3 is set other than at the full heating mode and the full cooling mode, both outputs form the calculation amplifiers 18, 20 become L level and the air mixing door M is stopped. However, in case of a full heating mode or a full cooling mode, they are set to show a relation of $V_D > V_H$ or a relation of $V_D < V_M$, either one of the calculation amplifiers 18, 20 becomes H level. That is, in case of a full heating mode, for example, a relation of $V_L > V_{IN}$ is made to cause the calculation amplifier 20 to become H level and in turn in case of a full cooling mode, for example, a relation of $V_{IN} > V_M$ is made to cause an output from the calculation amplifier 18 to become H level, resulting in a continuation of a flow of electric current in the motor 25. Thus, it is possible to have a close contact of the air mixing door M against the inner wall of the duct 7 under sufficient application of the electric current to the motor 25 until the air mixing door M is substantially in full contact with the inner wall of the duct under a full heating mode or a full cooling mode, further to prevent any control air from being leaked at a contacted portion between the door M and the duct 7 as well as to provide a positive setting of an air conditioning device to each of the full heating mode or full cooling mode. And when the air mixing door M is forcedly pressed against the duct 7 after the position setting means 3 is set to a full heating mode or a full cooling mode, resulting in that a load of the motor 25 is increased, a load electrc current is also increased to cause the output voltage $V_R$ at the resistor 30 to be increased. The capacitor 42 is gradually charged, thereby the base voltage of the transistor 39 is gradually increased. Then, the transistor 39 is turned ON to cause the base voltage of the transistor 46 to decrease, so that the transistor 46 is turned ON. The turned-on condition of the transistor 46 causes the base voltage of the transistor 39 to remain the same, and so the on-condition of the transistor 39 is kept or continued. As the transistor 46 is turned on, the base voltage of the transistor $T_1$ is increased to cause the transistor $T_1$ to be turned on, thereby the base voltages at the transistors 31, 32 are decreased through diodes 53, 51, so that the transistors 31, 32 are turned on and the transistors 26, 28 are turned off. Therefore, the transistors 26, 28 are turned off, an electric current flowed in the motor 25 is shut off after the load of the motor 25 is increased and a specified period of time elapses. When the transistor $T_1$ is turned on, an electric load charged in the capacitor 42 is abruptly discharged through diode $D_1$ and transistor $T_1$. That is, according to the present invention, as shown in FIG. 5, when the air mixing door M is set to a full heating mode or a full cooling mode in a period of time $t_1$, the air mixing door M abuts against the duct 7 and an electric load in the motor 25 is increased, the capacitor 42 is gradually charged, the base voltage of the transistor 39 is gradually increased. The transistor 39 is turned on after a period of time $t_s$ is past, the transistor 46 is turned on by the transistor 39 and then the on-condition of the transistor 39 is kept under the on-condition of the transistor 46. Because of the state of the transistor $T_1$, the transistors 26, 28 are turned off and then the motor 25 can be stopped while the air mixing door M is tightly contacted against the duct 7. The an electric load of the capacitor 42 may be abruptly discharged by this transistor $T_1$.

When the position setting means 3 is changed over from a full heating mode to a full cooling mode or from a full cooling mode to a full heating mode, either one of the calculation amplifiers 18, 20 is set to H level and the other is set to L level. During this changing-over operation, the outputs from the calculation amplifiers 18, 20 become L level, so that an emitter voltage of the transistor 46 may become zero, and the transistors 39, 46 and $T_1$ are recovered to their off-condition. Due to this fact, the operation for holding or keeping the shut-off condition of the input to the motor by the transistors 39, 46 and $T_1$ is released, so that the input may be fed to the motor 25. Therefore, when the outputs from the calculation amplifiers 18, 20 become H, L or L, H after a changing-over operation of the position setting means 3 is performed, an electric current is supplied motor 25 to cause the same to be rotated and the air mixing door M may be set again to a full heating mode or a full cooling mode.

As described above, it has been proposed that an electric load in the capacitor 42 connected to a base terminal of the transistor 39 be forcibly discharged simultaneously with shutting-off of the input to the motor at a predetermined time $t_2$. Such an enforced discharging as described above may provide the following effects.

That is, as described above, an electric charge in the capacitor 42 is increased in proportion to an increased load of the motor 25 as well as an increased load current in the resistor 30. Electric load increased up to a desired value may cause the input to the motor 25 to be shut off. At this time, if the electric load in the capacitor 42 is not fully discharged, the electric load is relatively gradually discharged through the resistors 40, 30 and the ground, so that its low level condition may not be rapidly attained. Due to the fact above, even after the input to the motor is shut off, the shut-off condition of the input to the motor may be kept under the electric load left in the capacitor. In this way, when the position setting means 3 is operated to provide a rapid changing-over operation from its full heating mode to its full cooling mode or from its full cooling mode to its full heating mode while the motor input shutting-off operation is continued, the capacitor 42 is charged again after the changing-over operation, so that the input to the motor is still kept as it is shut-off. Therefore, the motor 25 is not operated at all even if the position setting means 3 is changed over from its full heating mode to its full cooling mode or vice versa, so that the air mixing door M is closed to prevent operation from its full heating mode to its full cooling mode or vice versa.

However, according to the present invention, since an electric charge in the capacitor 12 is fully discharged after the motor input is turned off, the motor input is continued to be turned off with the remaining electric load in the capacitor 12 as described above, so it is possible to overcome or dissolve such a problem as the air mixing door M not being completely driven even if the position setting means 3 is changed over.

Further, according to the present invention, even if the motor is stopped due to an inclusion of some foreign materials in the air mixing door or in gear trains cooperatively driving the air mixing door and the motor 25, the transistor 39 is turned on because of the increased load of the motor 25, and the transistors 46 and $T_1$ are turned on, so that the input to the motor 25 can be shut off. An excessive electric current then flows in the motor 25, thus it is possible to prevent thermal damage to motor 25.

The present invention may be applied to a motor for controlling the air mixing door, though it should be understood that the present invention may not be limited to the motor as above, but also is useful in a motor for use in controlling, for example, an air control door such as a door for changing over indoor air and surrounding air and a mode setting door, as well as for a motor for use in controlling other devices of a motor vehicle.

What is claimed is:

1. In a vehicle motor driving circuit including a transistor circuit having a transistor for use in feeding both normal and reverse currents to a motor, a first amplifier for amplifying an output signal produced from a position setting means for setting a stationary position of the motor, a second amplifier for differentially amplifying both an output signal produced from said first amplifier and an output signal produced from a sensing means for sensing a rotational position of the motor, and a calculation circuit for controlling said transistor circuit in response to an output of said second amplifier, the improvement consisting in a control transistor having a power supply switch and which is operated for a specified period of time after said power supply switch is turned on, to turn off said transistor in said transistor circuit and then to keep the motor in an inoperative condition.

2. Vehicle motor driving circuit as set forth in claim 1 in which said power supply switch is connected to a base terminal of said control transistor through a capacitor for use in setting an initial condition, said control transistor being operated for such a period as the capacitor is charged after said power supply switch is turned on, and then stops the motor.

3. In a vehicle motor driving circuit including a transistor circuit having a transistor for use in feeding both normal and reverse currents to a vehicle motor, a first amplifier for amplifying an output signal produced from a position sensing means for use in setting a stationary position of the motor, a second amplifier for differentially amplifying both an output signal produced from said first amplifier and an output signal produced from a sensing means for sensing a rotational position of the motor, and a calculation circuit for controlling said transistor circuit by comparison with an output of said second amplifier, the improvement consisting in a control transistor which is operated for a specified period of time after a power supply switch is turned on, turns off said transistor in said transistor circuit to stop the motor, a load sensing capacitor charged by a voltage which is made by an excessive load current flowed in the motor, a motor lock prevention circuit for operating said control transistor when a charged voltage in said capacitor is reached up to a desired level and for setting the motor input to its shut-off condition, and an electric charge in said load sensing capacitor discharged through said control transistor when said control transistor is operated.

4. Vehicle motor driving circuit as set forth in claim (3) having a transistor constituting a self-holding circuit in which said control transistor is operated by said motor lock prevention circuit and said control transistor is subsequently kept operated when the motor input is shut off.

5. Vehicle motor driving circuit as set forth in claim (4) in which said transistor constituting said self-holding circuit is operated when a charged voltage in said load sensing capacitor is reached up to a desired level, and said control transistor is kept operating.

* * * * *